United States Patent
Ho et al.

(10) Patent No.: US 11,537,286 B2
(45) Date of Patent: *Dec. 27, 2022

(54) METHODS AND SYSTEMS FOR DISPLAYING CONTENT BASED ON A SCROLL PATTERN

(71) Applicant: Capital One Services, LLC, McLean, VA (US)

(72) Inventors: Chi-San Ho, Allen, TX (US); Yue Duan, Plano, TX (US); Micah Price, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/445,828

(22) Filed: Aug. 24, 2021

(65) Prior Publication Data

US 2021/0382594 A1    Dec. 9, 2021

Related U.S. Application Data

(63) Continuation of application No. 16/886,930, filed on May 29, 2020, now Pat. No. 11,099,729.

(51) Int. Cl.
*G06F 3/0485* (2022.01)
*G06Q 30/06* (2012.01)
*G06F 3/04845* (2022.01)

(52) U.S. Cl.
CPC ........ *G06F 3/0485* (2013.01); *G06F 3/04845* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 7,180,501 B2 | 2/2007 | Marvit et al. | |
| 8,781,532 B2 | 7/2014 | Gil et al. | |
| 9,654,598 B1 | 5/2017 | Crawford et al. | |
| 10,380,225 B1 | 8/2019 | Vagell et al. | |
| 10,691,740 B1 | 6/2020 | Angora et al. | |
| 2002/0186251 A1* | 12/2002 | Himmel | G06F 3/0485 715/784 |
| 2005/0166157 A1 | 7/2005 | Ollis et al. | |
| 2008/0209325 A1 | 8/2008 | Suito et al. | |
| 2013/0033525 A1 | 2/2013 | Markiewicz et al. | |
| 2013/0232110 A1 | 9/2013 | Li et al. | |
| 2014/0258039 A1 | 9/2014 | McDevitt et al. | |

(Continued)

*Primary Examiner* — Justin S Lee
(74) *Attorney, Agent, or Firm* — Bookoff McAndrews, PLLC

(57) ABSTRACT

Disclosed are systems and methods for displaying content on a user device. For example, a method of displaying content on a user device may include: receiving a first set of content data; arranging and displaying the first set of content in a first sequence of consecutive segments; detecting user input indicative of a scroll pattern of the user through the first sequence of consecutive segments; determining a preferred category based on the detected user input; receiving a second set of content data; arranging the second set of content data into a second sequence of consecutive segments based on the preferred category; and displaying the second set of content data in the arranged second sequence of consecutive segments on the display of the user device.

20 Claims, 13 Drawing Sheets

(56) References Cited

U.S. PATENT DOCUMENTS

| | | |
|---|---|---|
| 2014/0331169 A1 | 11/2014 | Dubey et al. |
| 2015/0033188 A1 | 1/2015 | Devi |
| 2015/0127813 A1 | 5/2015 | Li et al. |
| 2015/0205474 A1 | 7/2015 | Donelan |
| 2015/0205475 A1 | 7/2015 | Donelan et al. |
| 2016/0086219 A1 | 3/2016 | Richardson |
| 2018/0088788 A1 | 3/2018 | Cheung et al. |
| 2018/0232109 A1 | 8/2018 | Doan et al. |
| 2019/0386947 A1 | 10/2019 | Pavitt et al. |
| 2020/0034409 A1 | 1/2020 | Gourley et al. |

\* cited by examiner

FROM FIG. 3A          FROM FIG. 3A

302g —
- ALLOY WHEELS
- ANTI-LOCK BRAKES
- AUTO CLIMATE CONTROL
- AUTOMATIC HEADLIGHTS
- BODY COLORED BUMPERS
- BRAKING ASSIST
- CD (SINGLE DISC)
- CLOTH SEATS
- COMPASS
- CRUISE CONTROL
- DELAY-OFF HEADLIGHTS
- DOOR BIN
- DUAL-ZONE CLIMATE CONTROL
- FRONT AIRBAGS (DRIVER)
- FRONT AIRBAGS (PASSENGER)
- FRONT ANTI-ROLL BAR
- FRONT BUCKET SEATS
- FRONT CENTER ARMREST
- FRONT KNEE AIRBAGS (DRIVER)
- FRONT SIDE (AIRBAGS)
- PASSENGER SENSING AIRBAG
- POWER MIRRORS
- POWER STEERING
- POWER WINDOWS
- RADIO DATA SYSTEM
- READING LIGHTS
- REAR ANTI-ROLL BAR
- REAR WINDOW DEFROSTER
- REAR WINDOW WIPER
- SPEED-SENSING STEERING
- SPLIT/FOLDING SEATS
- SPOILER
- STABILITY CONTROL
- STEERING WHEEL CONTROLS
- TACHOMETER
- THERMOMETER
- TIRE PRESSURE MONITORING SYSTEM
- TRACTION CONTROL
- TRIP COMPUTER
- TURN SIGNAL MIRRORS
- VANITY MIRROR/LIGHT

302h —
TEXAS TOYOTA OF TENNISTOWN
101 VOLLEY WAY
TENNISTOWN, TX 76001

*FIG. 3A CONT.*

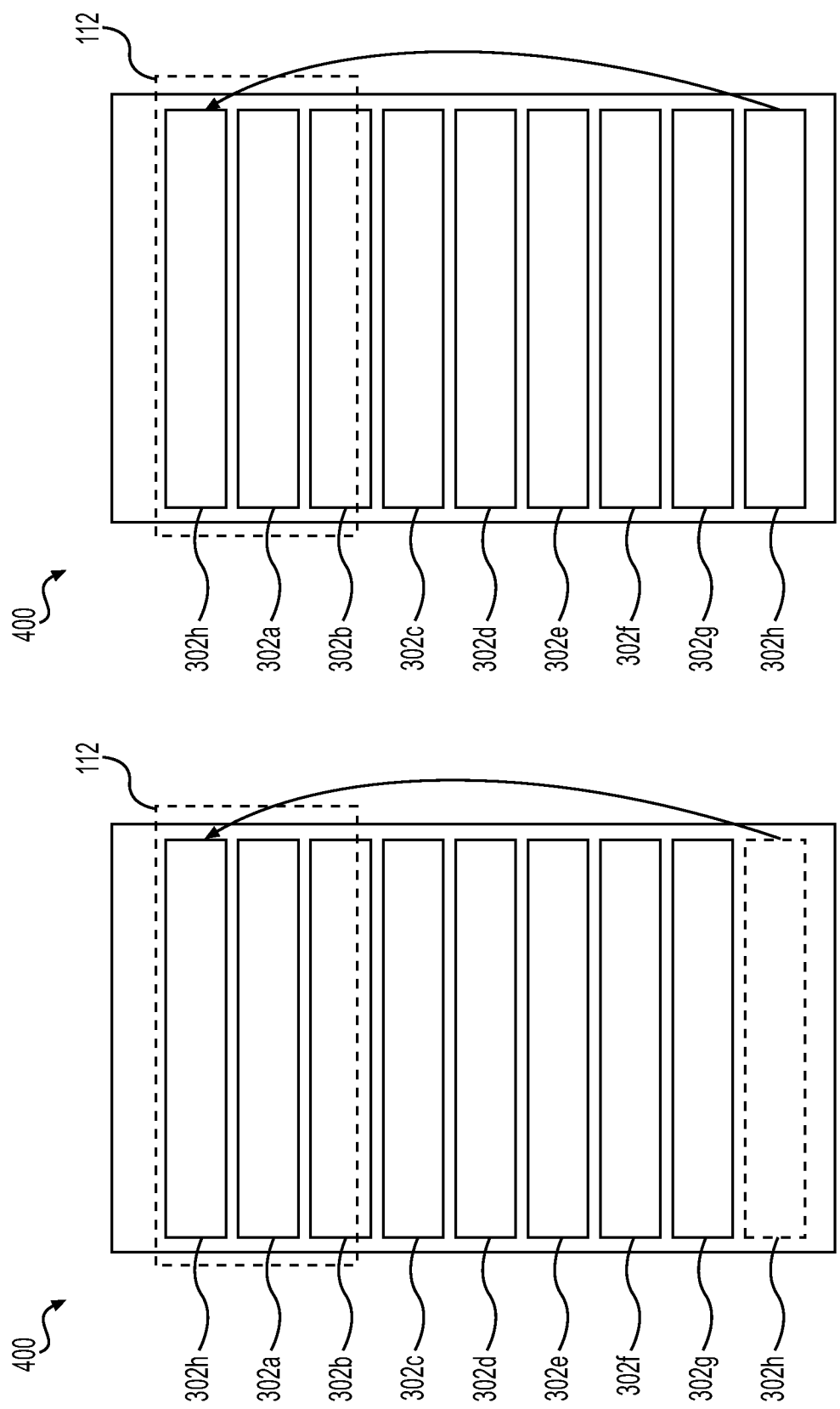

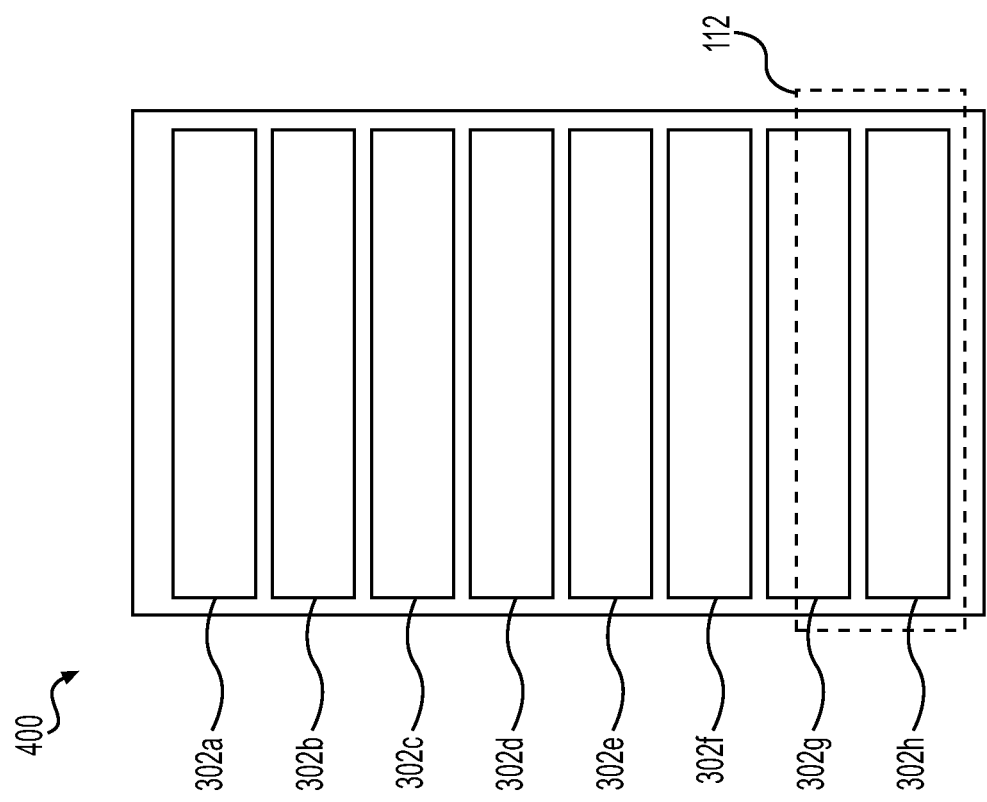

METHODS AND SYSTEMS FOR DISPLAYING CONTENT BASED ON A SCROLL PATTERN

CROSS-REFERENCE TO RELATED APPLICATION(S)

This patent application is a continuation of and claims the benefit of priority to U.S. Nonprovisional patent application Ser. No. 16/886,930, filed on May 29, 2020, the entirety of which is incorporated herein by reference.

TECHNICAL FIELD

Various embodiments of the present disclosure relate generally to methods and systems for displaying content on a user device, and more particularly, to methods and systems for displaying content on a user device including a display based on a user scroll pattern.

BACKGROUND

There is limited screen space on a user device, such as a mobile phone, to display content via web and mobile sites, e.g., shopping sites demonstrating information about item/service details, informational and/or news sites, and the like. Conventional methods and systems are configured to predetermine what content to show a population of users first. Accordingly, an individual user may need to scroll up or down to search for content of interest to the individual user. This may result in unnecessary scrolling for the individual user, and consequently, may result in individual user frustration and/or disengagement from browsing. Accordingly, there is a need for a framework that personalizes how content is displayed to an individual user.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for displaying content on a user device including a display based on a scroll pattern.

In one aspect, a method is disclosed for displaying content on a user device including a display. The method may include: receiving, via one or more processors, a first set of content data including a first subset of the first set of content data under a first category and a second subset of the first set of content data under a second category; arranging, via the one or more processors, the first set of content data into a first sequence of consecutive segments, wherein the first sequence of consecutive segments comprises a first segment including the first subset of the first set of content data and a second segment including the second subset of the first set of content data; displaying, via the one or more processors, the first set of content data in the arranged first sequence of consecutive segments on the display of the user device, wherein the user device is associated with a user; detecting, via the one or more processors, user input indicative of a scroll pattern of the user through the first sequence of consecutive segments; determining, via the one or more processors, a preferred category based on the detected user input, wherein the preferred category is the first category or the second category; receiving, via the one or more processors, a second set of content data including a first subset of the second set of content data under the first category and a second subset of the second set of content data under the second category; arranging, via the one or more processors, the second set of content data into a second sequence of consecutive segments based on the preferred category, wherein the second sequence of consecutive segments comprises a first segment including the first subset of the second set of content data and a second segment including the second subset of the second set of content data; and displaying, via the one or more processors, the second set of content data in the arranged second sequence of consecutive segments on the display of the user device.

In another aspect, there is provided a device for displaying content. The device may include a memory, a display, and one or more processors. The one or more processors may be configured to: receive a first set of content data including a first subset of the first set of content data under a first category and a second subset of the first set of content data under a second category; arrange the first set of content data into a first sequence of consecutive segments, wherein the first sequence of consecutive segments comprises a first segment including the first subset of the first set of content data and a second segment including the second subset of the first set of content data; display the first set of content data in the arranged first sequence of consecutive segments on the display of the user device, wherein the user device is associated with a user; detect user input indicative of a scroll pattern of the user through the first sequence of consecutive segments; determine a preferred category based on the detected user input, wherein the preferred category is the first or the second category; receive a second set of content data including a first subset of the second set of content data under the first category and a second subset of the second set of content data under the second category; arrange the second set of content data into a second sequence of consecutive segments based on the preferred category, wherein the second sequence of consecutive segments comprises a first segment including the first subset of the second set of content data and a second segment including the second subset of the second set of content data; and display the second set of content data in the arranged second sequence of consecutive segments on the display.

In another aspect, there is provided a system for displaying content on a user device including a display and associated with a user. The system may include a memory and one or more processors. The one or more processors may be configured to: receive a first set of content data including a first subset of the first set of content data under a first category and a second subset of the first set of content data under a second category; arrange the first set of content data into a first sequence of consecutive segments, wherein the first sequence of consecutive segments comprises a first segment including the first subset of the first set of content data and a second segment including the second subset of the first set of content data; cause display of the first set of content data in the arranged first sequence of consecutive segments on the display of the user device; receive detected user input indicative of a scroll pattern of the user through the first sequence of consecutive segments; determine a preferred category based on the received detected user input, wherein the preferred category is the first or the second category; receive a second set of content data including a first subset of the second set of content data under the first category and a second subset of the second set of content data under the second category; arrange the second set of content data into a second sequence of consecutive segments based on the preferred category, wherein the second sequence of consecutive segments comprises a first segment including the first subset of the second set of content data and a second segment including the second subset of the second set of content data; and cause display of the second set of content data in the arranged second sequence of consecutive segments on the display.

In another aspect, there is provided a method for displaying content on a user device including a display. The method may include: receiving, via one or more processors, a first set of content data including a first subset of the first set of content data under a first category and a second subset of the first set of content data under a second category; arranging, via the one or more processors, the first set of content data into a first sequence of consecutive segments, wherein the first sequence of consecutive segments comprises a first segment including the first subset of the first set of content data and a second segment including the second subset of the first set of content data; displaying, via the one or more processors, the first set of content data in the arranged first sequence of consecutive segments on the display of the user device; detecting, via the one or more processors, user input indicative of a scroll pattern of the user through the first sequence of consecutive segments; determining, via the one or more processors, a preferred category based on the detected user input, wherein the preferred category is the first category or the second category; receiving, via the one or more processors, a second set of content data including a first subset of the second set of content data under the first category and a second subset of the second set of content data under the second category; identifying, via the one or more processors, the subset of the second set of content data associated with the preferred category; arranging, via the one or more processors, the second set of content data into a second sequence of consecutive segments, wherein the second sequence of consecutive segments comprises a first segment including the first subset of the second set of content data and a second segment including the second subset of the second set of content data; duplicating, via the one or more processors, the identified segment associated with the preferred category; aggregating, via the one or more processors, the duplicated segment associated with the preferred category and the second set of content data arranged in the second sequence of consecutive segments; and displaying, via the one or more processors, the aggregated duplicated segment and the second set of content data in the arranged second sequence of consecutive segments on the display of the device.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 4A-4C depict exemplary embodiments of arranging content data, according to one or more embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Figure 1:
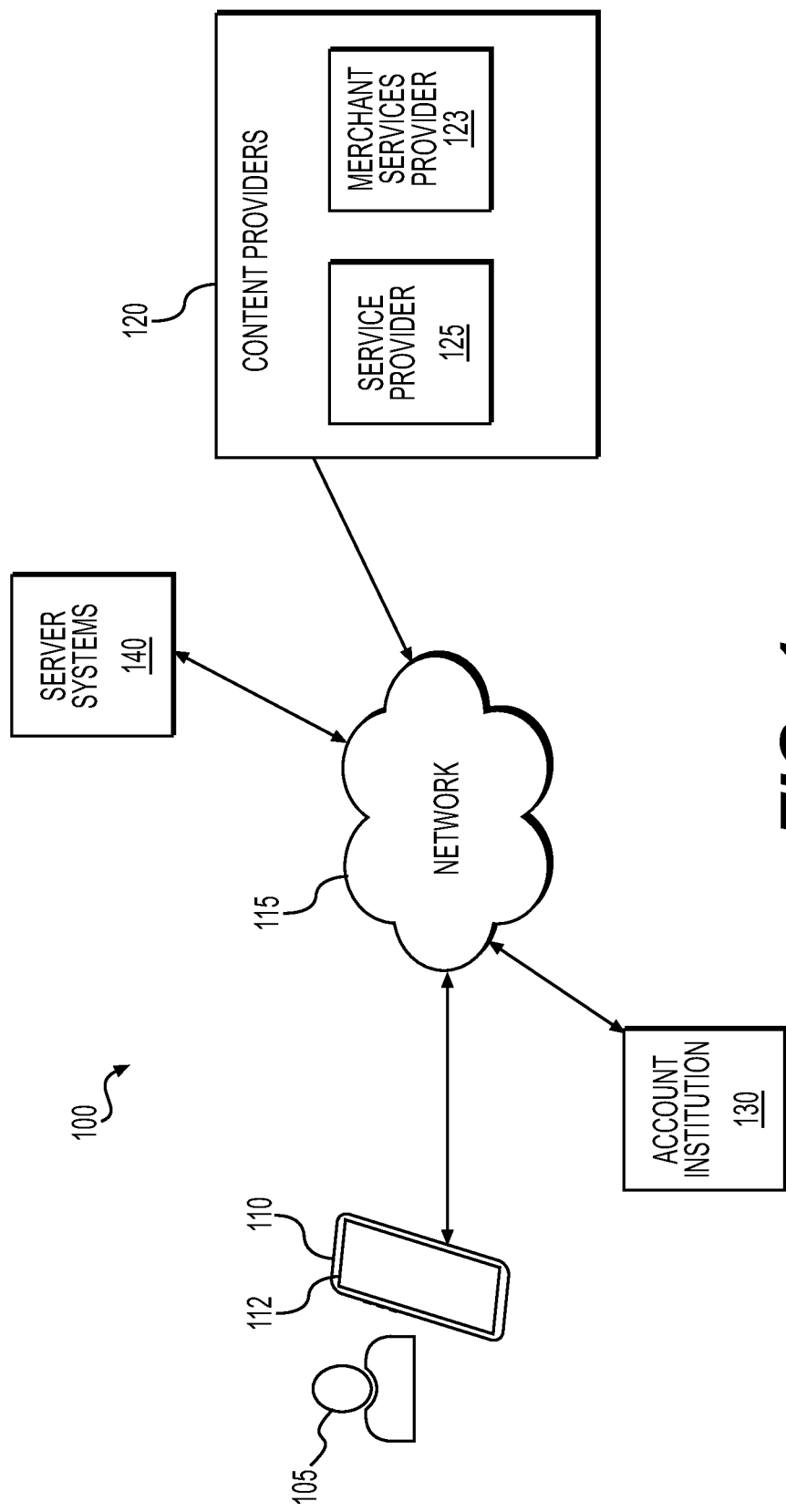
FIG. 1 depicts an exemplary system infrastructure, according to one or more embodiments.

FIG. 1 illustrates an exemplary system 100, which may encompass aspects of the embodiments disclosed herein, and/or in which steps of methods disclosed herein may be performed. System 100 may include a network 115, which may connect (e.g., permit communication between) a user device 110, content providers 120, account institutions 130, and server systems 140.

System 100 may include computer hardware, computer software, and/or combinations of both associated with each aspect of system 100. Aspects of system 100 may be located in similar or disparate locations. In some instances, for example, user device 110, content providers 120, and server systems 140 may each be in separate physical locations (e.g., on separate computer systems, in separate databases, and/or in separate geographic locations). In some instances, for example, multiple user devices 110, multiple content providers 120, and multiple server systems 140 may be located in separate geographical locations. In further instances, two or more of the aspects of system 100 may be located in the same physical location, e.g., on the same computer, in the same database, or in the same geographic location. For example, a content provider 120 may house a server system 140 at a geographic location.

Aspects and components of system 100 may be connected by wired or wireless connections. Some such connections are represented by the straight lines connecting some of the aspects of system 100 in FIG. 1; however, it is contemplated that additional or different wired or wireless connections may exist between aspects of system 100. Wired or wireless connections between aspects of system 100 may include, for example, connections within a single machine, or wired or wireless connections over a local area network or a wide area network (e.g., the Internet). Furthermore, while aspects of system 100 are shown in FIG. 1, it is contemplated that system 100 may include more components, fewer components, and/or alternate or additional configurations of the depicted components.

Network 115 may be any suitable wired or wireless network, or combination of wired or wireless networks. For example, in some embodiments, network 115 may include a local area network (LAN), wide area network (WAN), a public switch telephone network (PSTN), and/or the Internet. Generally, network 115 may serve to electronically connect two or more components of system 100, or two or more computers, electronic terminals, databases, servers, devices, user interfaces, or other electronic aspects of one or more components of system 100. Any part of system 100 may be connected directly to another (e.g., via a wired or wireless connection) over network 115, or may be connected indirectly via one or more intermediary servers, computers, LANs, WANs, routers, etc. to another part or parts of system 100. In some embodiments, network 115 may be simply a plurality of electronic connections between devices, servers, and the like.

User device 110 may be a device suitable for connecting to other components of system 100 via network 115. A user 105 of the user device 110 may be a customer, subscriber, party to an agreement of, or otherwise associated with one or more content providers 120. In some embodiments, the user 105 of the user device 110 may be enrolled in one or more programs, rosters, account types, services, etc. of a content provider 120. In some embodiments, the user device 110 may include any type of computing device, such as a mobile and/or desktop computing device, comprising a display 112. For example, the user device 110 may be a smartphone, wearable computing device, tablet computer, laptop, desktop computer, and/or vehicle computer systems. The user device 110 may be configured to receive content data from content providers 120, as will be described in further detail below. Such received content data may be displayed to the user 105 via the display 112.

Content providers 120 may include any institutions, businesses, individuals, or organizations capable of transmitting content to the user device 110. In some embodiments, the content providers 120 may include a service provider 125 and/or a merchant service provider 123.

Service providers 125 (also referred to as merchants in some instances) may include any institutions, businesses, individuals, or organizations providing services or products (also referred to as items) to, e.g., users within system 100 (e.g., user 105 of the user device 110). Nonlimiting examples of service providers 125 may include merchants (e.g., automobile companies, automobile dealerships, clothing companies, book companies, household good suppliers, etc.), medical service providers (e.g., hospitals, doctors, surgical centers, diagnostics laboratories, emergency responders, etc.), professional service providers (e.g., accountants, lawyers, insurance companies), etc. In some embodiments, service providers 125 may require payments from a user in exchange for services performed or products purchased. In some embodiments, a service provider 125 may be associated with merchant services provider 123 for processing a payment from a user to the service provider 125. In some embodiments, merchant services provider 123 may include one or more servers or server systems storing transaction details related to transactions between users, e.g., user 105, and service providers 125. Such servers or server systems may be connected to other aspects of system 100 via one or more connections, such as via network 115.

Account institutions 130 may be any entities or organizations offering accounts to users, e.g., user 105 of the user device 110. An account may be any type of account directly or indirectly related to a user's finances. Examples include bank accounts, investment accounts, loan accounts (e.g., for auto loans, student loans, mortgages, or other loans), credit accounts, or accounts for managing regular payments (e.g., student or tuition accounts, leases, etc.). In some embodiments, account institutions 130 may include one or more servers or server systems storing the details of accounts associated with users. Such servers or server systems may be connected to other aspects of system 100 via one or more connections, such as via network 115. In some situations, an account institution 130 may also be a merchant services provider 123, or vice versa.

Server system 140 may comprise one or more computers, and may be configured to house databases or other electronic storage systems. Further, server system 140 may be configured to store and/or execute one or more functions, algorithms, or manipulations of data housed within it or transferred to it. In some embodiments, server system 140 may receive and send data via, e.g., network 115, and may store, manipulate, or perform calculations using such data. Server system 140 may also be configured or authorized to access, send, retrieve, or manipulate data from other aspects of system 100, such as from content providers 120. In some embodiments, server system 140 may house one or more machine learning algorithms and may execute such algorithms according to methods of the present disclosure. In some embodiments, server system 140 may include one or more modules, models, or engines, which may each be software components stored in the server system 140. Server system 140 may be configured to utilize one or more modules, models, or engines when performing various methods described in this disclosure.

In some examples, server system 140 may have a cloud computing platform with scalable resources for computation and/or data storage, and may run one or more applications on the cloud computing platform to perform various computer-implemented methods described in this disclosure. In some embodiments, some of the one or more modules, models, or engines may be combined to form fewer modules, models, or engines. In some embodiments, some of the one or more modules, models, or engines may be separated into separate, more numerous modules, models, or engines. In some embodiments, some of the one or more modules, models, or engines may be removed while others may be added. While one server system 140 is depicted in FIG. 1, it is contemplated that, in some aspects, multiple server systems 140 may be a part of systems of the present disclosure and/or may execute methods of the present disclosure in concert.

Figure 2:
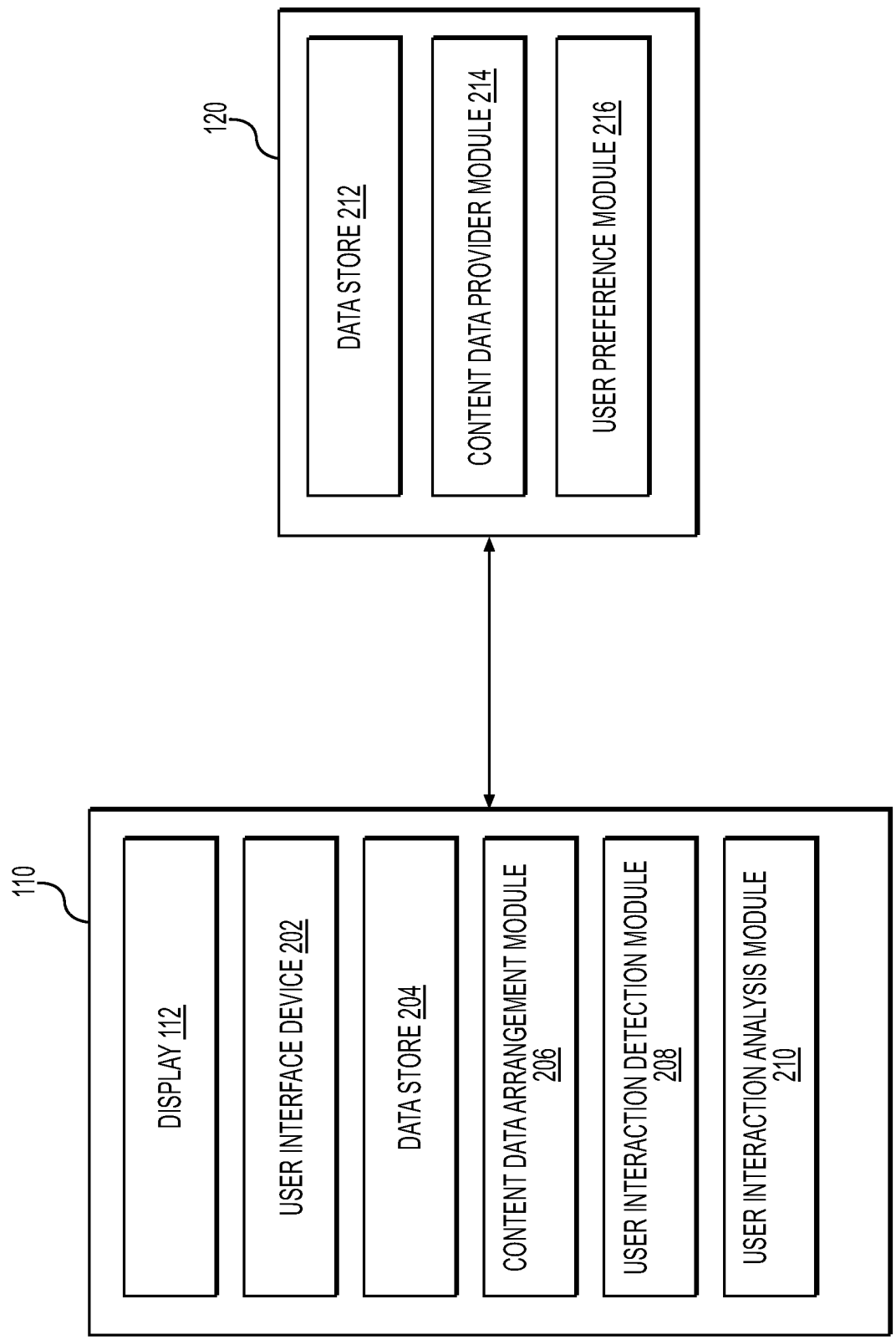
FIG. 2 depicts an exemplary user device and an exemplary content provider, according to one or more embodiments.

FIG. 2 depicts an exemplary embodiment of the user device 110 and the content provider 120, according to one or more embodiments. As shown in FIG. 2, the content provider 120 may include a data store 212, a content data provider module 214, and a user preference module 216. In some embodiments, the content data provider module 214 may generate and transmit content data sets for distribution to user device 110. For example, content data provider module 214 may be configured to provide content, such as one or more documents, including web documents and other web resources. The stream of content may include a predetermined set of content data in a set order. In some embodiments, user preference module 216 may be configured to receive analyzed user interactions, preferences associated with a user based on the analyzed user interactions, and/or a rearranged set of content data from the user device 110, as will be described in further detail below. In such embodiments, the received analyzed user interactions, preferences associated with a user based on the analyzed user interactions, and/or rearranged set of content data may be stored in the data store 212. The received information may be used by the content data provider module 214 to rearrange a predetermined set of content data that was previously in a set order.

As shown in FIG. 2, the user device 110 may include the display 112, a user interface device 202, a data store 204, a content data arrangement module 206, a user interaction detection module 208, and a user interaction analysis module 210 according to some embodiments. In some embodiments, content data arrangement module 206, user interaction detection module 208, and/or user interaction analysis module 210 may be included in a package, e.g., a software package, that may be provided by server system 140 or content providers 120. For example, the package may be downloaded on user device 110 and installed as an application on user device 110 including content data arrangement module 206, user interaction detection module 208, and/or user interaction analysis module 210.

The content data arrangement module 206 may be configured to receive and arrange content data transmitted by the content provider 120. In some embodiments, the received content data may include a set of content data including two or more subsets of content data, e.g., a first subset and a second subset of the set of content data. In some embodiments, the received content data may include metadata indicating that the two or more subsets of content data be arranged in a specific order. For example, the metadata may indicate that the first subset and the second subset be placed consecutively in a sequence where the second subset follows the first subset. In some embodiments, each subset of content data may include information indicating the position of the respective subset relative to the received set of content data. Accordingly, the content data arrangement module 206 may arrange the set of content data such that the set of content data is displayed to the user (e.g., user 105) on the display 112 in the arranged sequence, e.g., the second subset following the first subset. An exemplary embodiment of the arranged set of content data is depicted in and described below with reference to FIGS. 3A-3D.

In some embodiments, each subset of the content data may be associated with a different category of information. For example, the content data may be related to an automobile for sale, as will be described in further detail below with reference to FIGS. 3A-3D. Accordingly, each subset of content data may be associated with a different category of information with reference to the automobile for sale. In such instances, a subset of content data may include information associated with a price for the automobile for sale, e.g., price category. Another subset of content data may include a high level summary of the automobile for sale, e.g., automobile summary category. Yet another subset of the content data may include miscellaneous features regarding the automobile for sale, e.g., other features category. While the different category of information is described with reference to an automobile for sale, it is understood that the content data may be related to any information provided by the content provider 120. Accordingly, the categories associated with the one or more subset of content data may vary in other embodiments.

The user interface device 202 may include one or more devices configured to allow a user (e.g., user 105) to interact with content data shown on the display 112, such as a mouse, a keyboard, a keypad, a wheel device, a ball device, a track device, a joystick, a stylus, a touch screen including but not limited to resistive and/or capacitive touch screens, any other touch interface, or any other device that allows a user to interact with content data shown on the display 112.

The user interaction detection module 208 may be configured to detect user interaction with the content data shown on the display 112. For example, the user interaction detection module 208 may be configured to detect user input via the user interface device 202. In some embodiments, the user interaction detection module 208 may be configured to detect user input indicative of a scroll pattern. In some embodiments, the scroll pattern may include any type of gesture, a velocity of gestures performed, a pause in between gestures, a pressure of gestures performed, any repetition of gestures, speed of gestures performed, etc. In some embodiments, the user interaction detection module 208 may be configured to detect user input indicative of a term, a phrase, and/or a letter of the term and/or phrase. For example, the user interaction detection module 208 may detect that the user has input a letter, e.g., "S," or a term, e.g., "satellite," on a keyboard and/or a virtual keyboard via a touch screen.

The user interaction analysis module 210 may be configured to analyze the user interactions detected by the user interaction detection module 208. In some embodiments, the user interaction analysis module 210 may determine a user preference with respect to the content data based on the user input detected by the user interaction detection module 208. For example, the user interaction detection module 208 may detect that a user has scrolled through the arranged set of content data and paused the scrolling motion at a certain point in the arranged set of content data. The user interaction analysis module 210 may determine one or more subsets of content data that is being displayed to the user when the user has paused the scroll motion. In some embodiments, the user interaction analysis module 210 may be configured to determine whether the user has paused the scroll motion for a predetermined amount of time, and determine that the one or more subsets of content data being displayed to the user is of interest to the user as a result of determining that the user has paused the scroll motion longer than the predetermined amount of time.

In some embodiments, the duration of the pause that indicates user interest may be determined or the detected pause may be weighted for determining the user interest based on the one or more subsets of content data being displayed to the user. For example, if the displayed content data includes one subset including small-sized text (e.g., content relatively time consuming and/or difficult to understand for the user) and an adjacent subset including one or more figures and/or large-sized text (e.g., content relatively quick and/or easy to understand for the user), a relatively short pause while displaying the two subsets may indicate that the user is interested in the subset that is relatively quick and easy to understand. Similarly, a relatively long pause while displaying the two subsets may indicate that the user is interested in the subset that is relatively time consuming and/or difficult to understand. In some embodiments, a pause initiated after scrolling to the bottom of the content data may be excluded from the determination of user interest in the content data. In some embodiments, a threshold time duration may be set such that a pause that exceeds the threshold time duration may be excluded from the determination of user interest in the content data or assigned a lower weight with reference to determining the user interest in the content data.

In some embodiments, each subset included in the arranged set of content data may be allocated a predicted pause duration. The predicted pause duration for each subset may be determined based on historic user preferences and uses. For example, the predicted pause duration may be an average pause duration based on historic user preferences and uses. Such predicted pause durations may be based on aggregated data (e.g., historic user preferences and uses) and/or statistical modeling based on features such as content amount (e.g., number of words), content complexity (e.g., content including abstract concepts or straightforward concepts), etc. Accordingly, the user interaction analysis module 210 may be configured to determine whether a detected pause duration exceeds a predicted pause duration for a displayed subset of the arranged set of content data. For example, the user interaction analysis module 210 may determine that the user is interested in a displayed subset in which the detected pause duration exceeds the predicted pause duration for the displayed subset.

In some embodiments, the user interaction detection module 208 may detect random scroll patterns. In such embodiments, the user interaction analysis module 210 may determine that the random scroll pattern may indicate that the user may be searching for content. In some embodiments, the user interaction detection module 208 may detect an even scroll pattern. In such embodiments, the user interaction analysis module 210 may determine that the user may be engaged with the currently displayed content. In some embodiments, the user detection module 208 may detect a speed increase in scroll pattern. In such embodiments, the user interaction analysis module may determine that the user may be disengaged or is becoming less engaged. In some embodiments, the user interaction detection module 208 may detect a letter, term, and/or phrase input provided by the user via the user interface device 202. In such embodiments, the user detection module 208 may determine that the user may be interested in content containing such letter, term, and/or phrase. For example, the user may be searching for a specific feature that starts with an "s" (e.g., satellite radio). In such instances, the user may input the letter "s" via the user interface device 202 and such input may be detected by the user interaction detection module 208. Accordingly, the user interaction analysis module 210 may determine that the user may be interested in content containing, or starting with, the letter "s."

Accordingly, the user interaction analysis module 210 may be configured to determine a user preference with respect to the subsets. In some embodiments, the user interaction analysis module 210 may be configured to determine one or more subsets on the set of the content data may be of interest to the user. As described above, each subset may be associated with a category of information. In some embodiments, the user interaction analysis module 210 may be configured to determine one or more categories of information that may be of interest to the user. In some embodiments, the user interaction analysis module 210 may be configured to determine a user preference based on a plurality of sets of content data. For example, the user interaction detection module 208 may detect user input for a first set of content data and a second set of content data received from one or more content providers 120. In such instances, the user interaction analysis module 210 may be configured to determine the user preference based on the detected user input based on the first and second sets of content data. While only two sets of content data are described, it is understood that the user interaction analysis module may determine the user preference based on detected user input from three or more sets of content data.

Referring back to the content data arrangement module 206, the content data arrangement module 206 may be configured to rearrange the received content data based on the user interactions detected by user interaction detection module 208 and analyzed by the user interaction analysis module 210. In some embodiments, the content data arrangement module 206 may be configured to receive new content data and arrange the received new content data based on the user interactions analyzed by the user interaction analysis module 210. For example, the content data arrangement module 206 may obtain a category of information preferred by the user from the user interaction analysis module 210. In such instances, the content data arrangement module 206 may identify a subset of the new content data that is associated with the preferred category of information. Accordingly, the content data arrangement module 206 may be configured to arrange the received new content data based on the identified subset associated with the preferred category of information. In some embodiments, the content data arrangement module 206 may rearrange the set of content data or arrange the set of new content data such that one or more subsets of most interest to the user may be displayed to user prior to the remaining subsets, as will be described in further detail below with reference to FIGS. 4A-4C and 5A-5B. In some embodiments, the analyzed user interactions, the preferences associated with the user based on the analyzed user interactions, the received content data, and the rearranged set of content data may be stored in the data store 204. In some embodiments, the analyzed user interactions, preferences associated with the user based on the analyzed user interactions, and/or the rearranged content data may be transmitted to the content provider 120. In such embodiments, user preference module 216 may set the rearranged set of content data as the default order for the next transmission of the same set of content data set to the user device 110 or any other user device. In some embodiments, user preference module 216 may adjust a predetermined set order for the set of content data based on the received analyzed user interactions, preferences associated with the user based on the analyzed user interactions, and/or the rearranged content data.

Figure 3A:
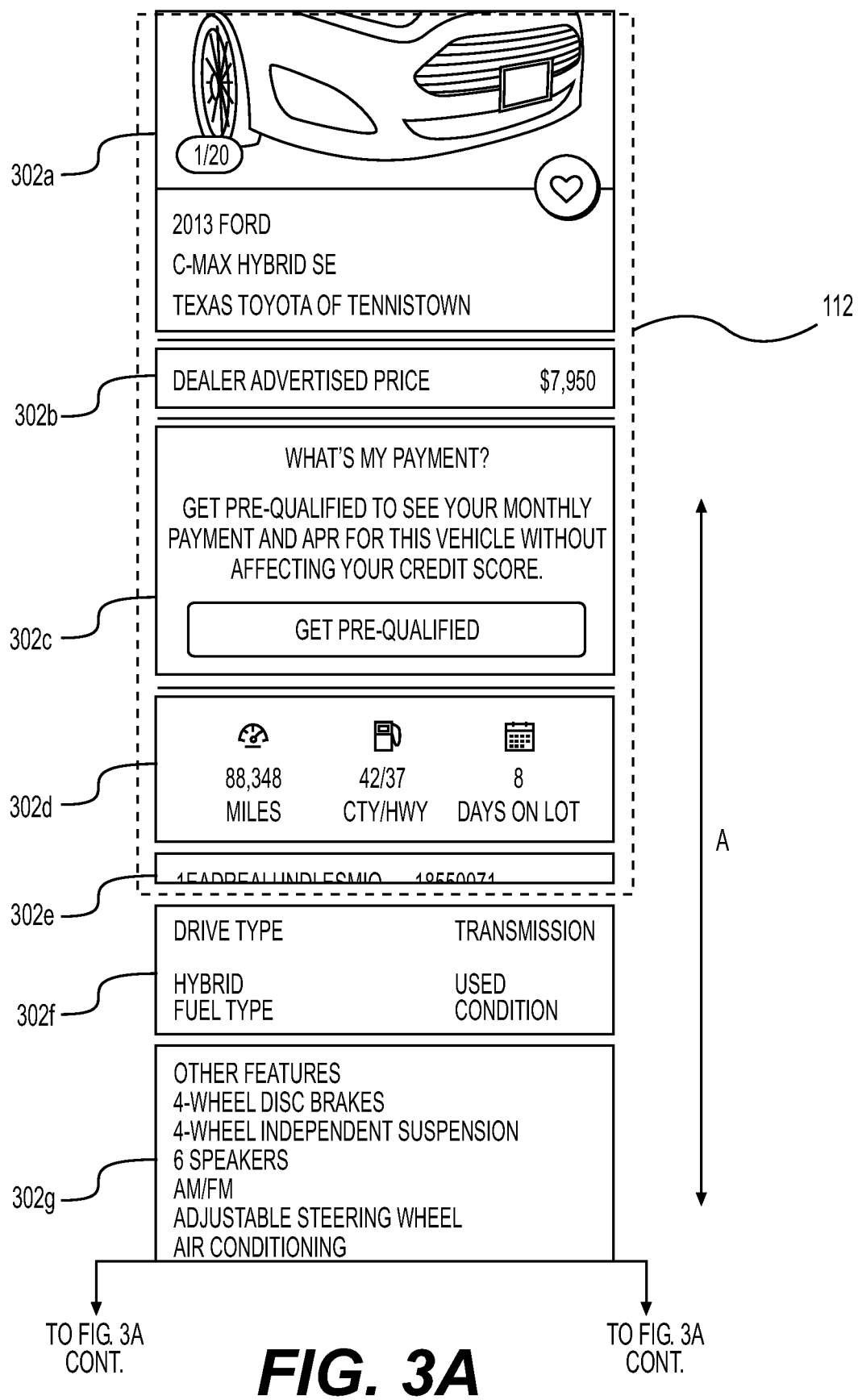
FIGS. 3A-3D depict exemplary embodiments of content data, according to one or more embodiments.

FIGS. 3A-3D depict an exemplary embodiment of a set of content data 300 displayed on the user device 110 according to one or more embodiments. FIG. 3A shows a set of content data 300 associated with a vehicle details page (VDP). As shown in FIG. 3A, the set of content data 300 may be arranged in the order received from the content provider 120. For example, the content data arrangement module 206 may arrange the set of content data 300 as shown in FIG. 3A. The set of content data 300 may include a plurality of subsets 302a-302h including information directed to an automobile for sale. As shown in FIG. 3A, the set of content data 300 may include a first subset 302a including information directed to the model, make, and year of the automobile. The first subset 302a may be associated with a category of information, e.g., title category. A second subset 302*b* may include a price for the automobile for sale. Similarly, the second subset 302*b* may be associated with a category of information, e.g., price category. A third subset 302*d* may include automobile information associated with the automobile for sale. For example, the automobile information may include miles per gallon (mpg), mileage, etc. The third subset 302*d* may be associated with a category of information, e.g., automobile information category. A fourth subset 302*g* may include information directed to other features associated with the automobile for sale. In some embodiments, the information directed to the other features may include a list of car features, e.g., air conditioning, Bluetooth, power steering, heated seats, etc. In some embodiments, the information directed to the other features may be listed in a predetermined order, e.g., alphabetical order. The fourth subset 302*g* may also be associated with a category of information, e.g., other features category. For the purpose of conciseness and simplicity, four subsets 302*a*, 302*b*, 302*d*, 302*g* have been described. It is understood, however, that the set of content data 300 may include further subsets, e.g., 302*c*, 302*e*-302*f* and 302*h* (e.g., payment calculation, dealership information, identification details, etc.) or more subsets, or less subsets in alternative embodiments. It is also understood, that the set of content data 300 may be directed to any type of merchandise and/or service other than an automobile for sale in some embodiments.

Figure 3B:
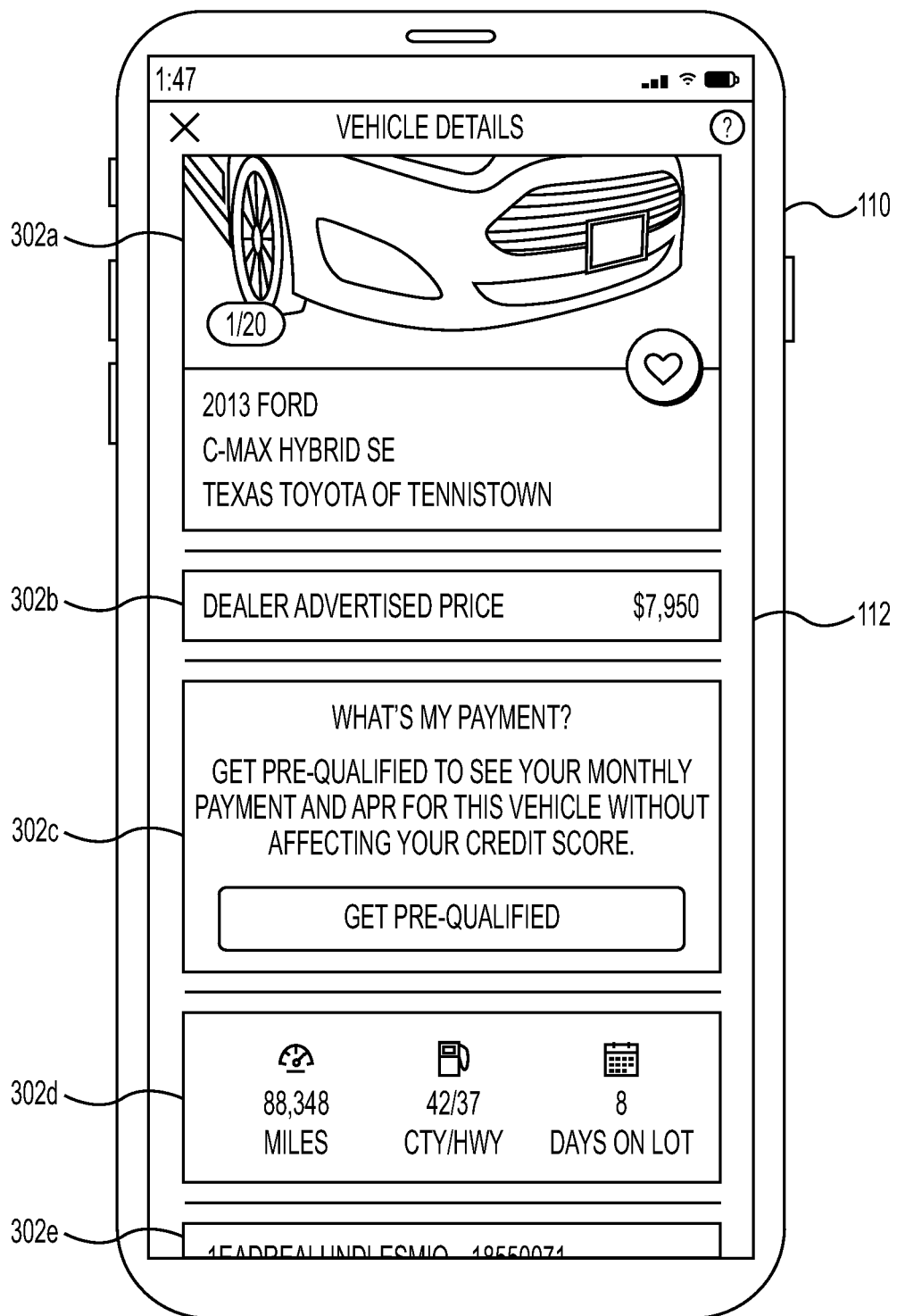
Figure 3C:
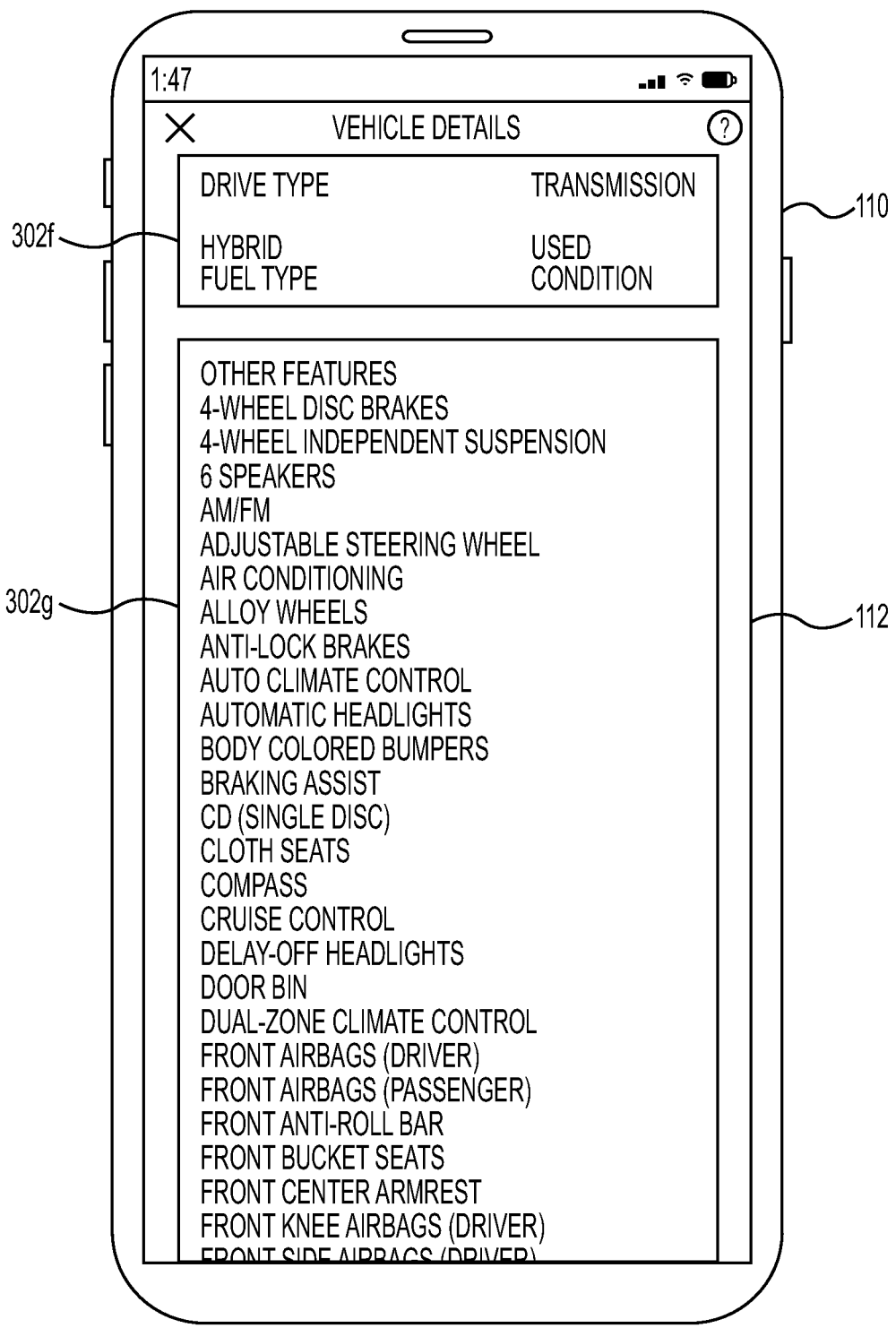
Figure 3D:
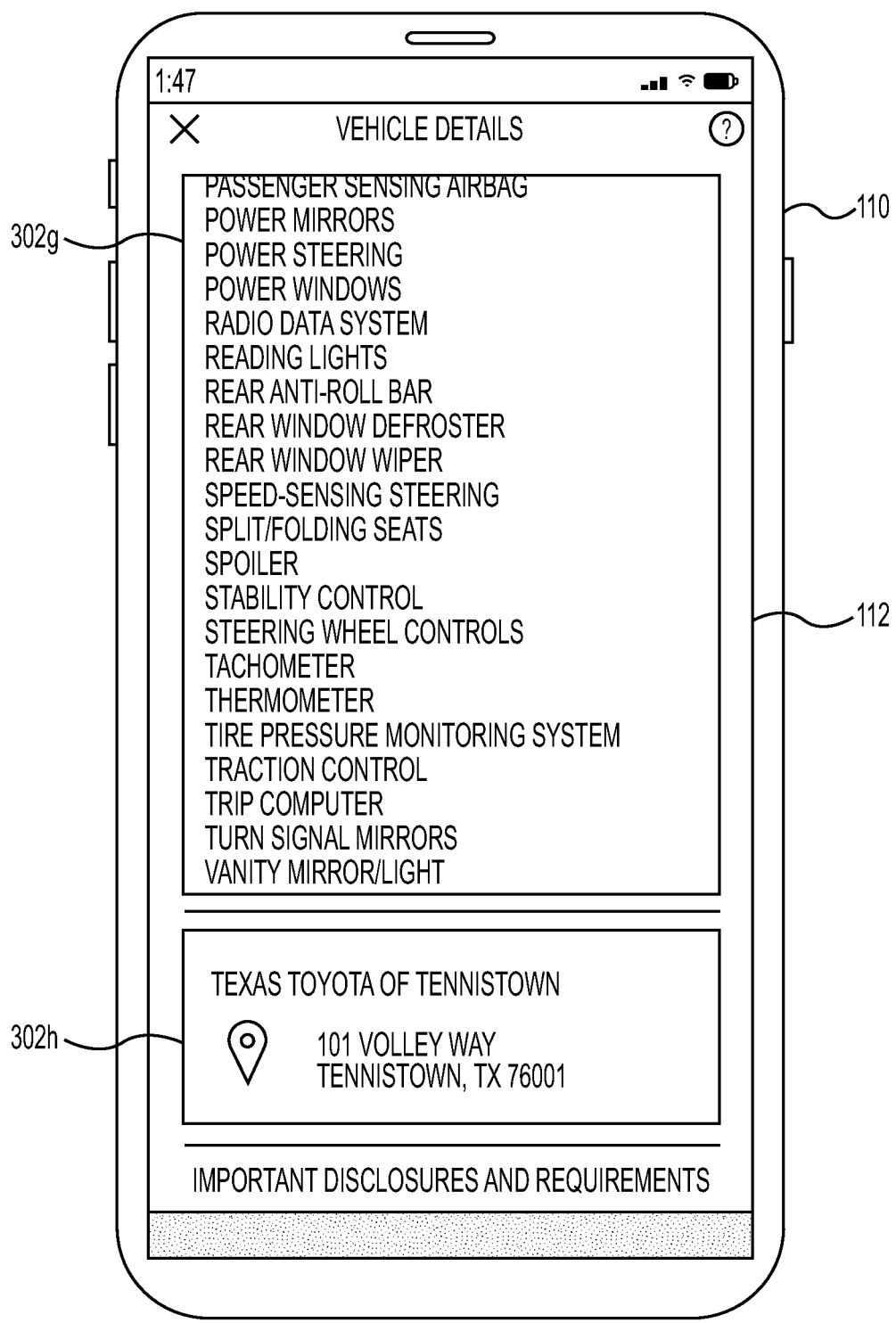

FIG. 3A also depicts how the set of content data 300 may be shown to a user on the display 112 of the user device 110. As shown in FIG. 3A, the display 112 may show a portion of the set of content data 300 and the user may scroll up or down, as indicated by direction A, to access different portions of the set of content data 300, as shown in FIGS. 3B-D.

In some embodiments, a user (e.g., user 105) may be interested in a specific subset of the content data 300. For example, the user may be interested in the subset 302*h* including information regarding the dealership information for the automobile for sale. In such instances, the user may scroll down the set of content data 300 to subset 302*h*, as shown in FIG. 3D. In some embodiments, the user interaction detection module 208 may be configured to detect that the user has scrolled down to the set of content data 300 including subset 302*h*. For example, the user interaction detection module 208 may detect that the user has continuously scrolled down to subset 302*h* and paused for a period of time. In some embodiments, the user interaction analysis module 210 may be configured to determine that the user is interested in subset 302*h* based on the user input detected by the user interaction detection module 208. For example, the user interaction analysis module 210 may determine that the user is interested in subset 302*h* based on the scrolling velocity, scrolling acceleration, and the duration of the pause. Accordingly, the user interaction analysis module 210 may further determine that the user is interested in a category of information associated with the subset 302*h*.

In such embodiments, the content data arrangement module 206 may be configured to rearrange the set of content data 300 to a rearranged set of content data 400 as shown in FIGS. 4A-4C. In some embodiments, the content data arrangement module 206 may be configured to receive a new set of content data including one or more subsets that overlap with the set of content data 300. In such embodiments, the content data arrangement module 206 may be configured to identify a subset in the new set of content data that may be associated with a preferred subset in the set of content data 300. For example, the content data arrangement module 206 may be configured to determine a category associated with the preferred subset in the set of content data 300 and identify the subset in the new set of content data associated with the determined category. Accordingly, the content data arrangement module 206 may be configured to arrange the new set of content data as shown in FIGS. 4A-4C based on the subset associated with the determined category.

FIG. 4A depicts an exemplary embodiment of the rearranged set of content data 400 according to some embodiments. In the example depicted in FIG. 4A, the content data arrangement module 206 may be configured to rearrange the set of content data 300 such that subset 302*h* is positioned at the top of the set of content data 300, thereby obtaining the rearranged set of content data 400 (subset 302*h* in dashed lines depicted in FIG. 4A indicates the position of the subset 302*h* prior to being rearranged). As shown in FIG. 4A, the rearranged set of content data 400 may allow a user to view the subset 302*h* on the display 112 before the remaining subsets. It is understood that the subset 302*h* may be rearranged to any position within the set of content data 300 in some embodiments.

FIG. 4B depicts another exemplary embodiment of the rearranged set of content data 400 according to some embodiments. In the example depicted in FIG. 4B, the content data arrangement module 206 may be configured to duplicate the subset 302*h* and aggregate the duplicated subset 302*h* with the set of content data 300, thereby obtaining the rearranged set of content data 400. As shown in FIG. 4B, the rearranged set of content data 400 may allow a user to view the duplicated subset 302*h* on the display 112 before the remaining subsets. It is understood that the duplicated subset 302*h* may be aggregated with the set of content data 300 such that the duplicated subset 302*h* may be in located any position within the set of content data 300 in some embodiments.

FIG. 4C depicts another exemplary embodiment of the rearranged set of content data 400 according to some embodiments. In the example depicted in FIG. 4C, the content data arrangement module 206 may be configured to automatically scroll down the set of content data 300 to the subset 302*h* such that the user may view the subset 302*h* on the display 112 without having to scroll down to it. While FIGS. 4A-4C have been described with reference to subset 302*h*, it is understood that the embodiments disclosed with reference to FIGS. 4A-4C may be applied any one or more subsets included in other sets of content data, e.g., new sets of content data, in some embodiments.

Figure 5B:
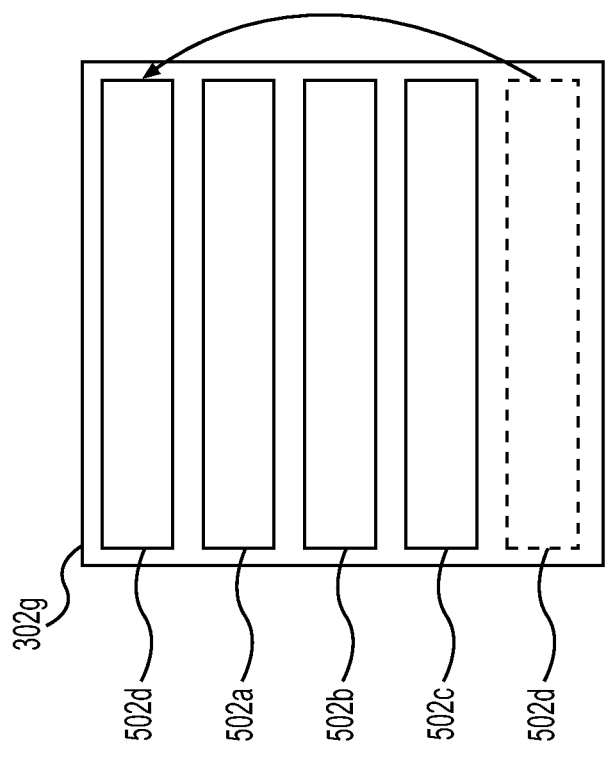
FIGS. 5A-5B depict exemplary embodiments of arranging content data, according to one or more embodiments.
Figure 5A:
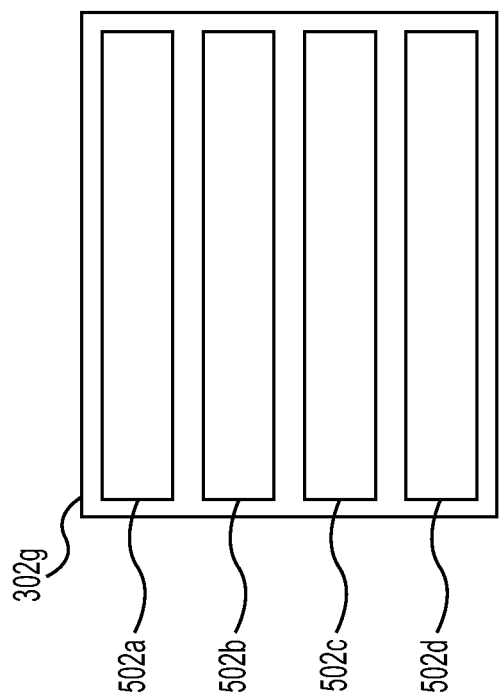

In some embodiments, the user interaction analysis module 210 may determine that the user is interested in certain content within a subset of a set of content data based on user input detected by the user interaction detection module 208. In some embodiments, a subset of a content data may include information with a plurality of items. For example, the subset 302*g* may include information directed to other features associated with the automobile for sale, as shown in FIG. 3D. The information directed to the other features may include a list of items 502*a*-502*d*, e.g., a list of car features such as air conditioning, Bluetooth, power steering, heated seats, etc., as shown in FIG. 5A. The items 502*a*-502*d* may initially be arranged in alphabetical order (or any other predetermined order). For example, item 502*a* may be air conditioning, item 502*b* may be Bluetooth, item 502*c* may be heated seats, and item 502*d* may be power steering. As an example, the user interaction analysis module 210 may determine that the user is always interested in power steering, item 502*d*. In such instances, the content data arrangement module 206 may be configured to rearrange the list of items included in subset 302*g* as shown in FIG. 5B. In some embodiments, the list of items may be rearranged such that item 502*d* is positioned at the top of the list of items (item 502*d* in dashed lines depicted in FIG. 5B indicates the position of the item 502*d* prior to being rearranged). In some embodiments, the item 502*d* may be duplicated and the duplicated item 502*d* may be aggregated to the list of items. In some embodiments, text and/or figures included in item 502*d* may be bolded and/or otherwise emphasized to draw the user's interest.

Referring back to the determination of whether the user is interested in certain content within a subset of a set of content data, the user interaction analysis module 208 may determine which portions of the subset of the set of content data is visible to the user on the display 112 when the user has stopped scrolling. That is, the user interaction analysis module 208 may extract the visible portions of the subset and store the extracted portions in the data store 204 (hereinafter referred to as the "first extracted portions"). The next time the user scrolls down to the subset of the set of content data, the user interaction analysis module 208 may again extract the visible portions of the subset to the user and store the extracted portions in the data store 204 (hereinafter referred to as the "second extracted portions"). In some embodiments, the user interaction analysis module 208 may cross reference the first extracted portions and the second extracted portions to determine overlap between the two extracted portions. The user interaction analysis module 208 may continue to extract further portions and cross reference with the additional extracted portions to determine whether the user is interested in certain content within a subset of a set of content data and/or to refine a presentation order of content 300. For example, the user may be searching for specific content, such as, for example, satellite radio. In such instances, the first extracted portions and the second extracted portions may both include the term "satellite radio" along with other ancillary information. Accordingly, the user interaction analysis module 208 may be configured to identify "satellite radio" as specific content that the user may be interested in.

Figure 6:
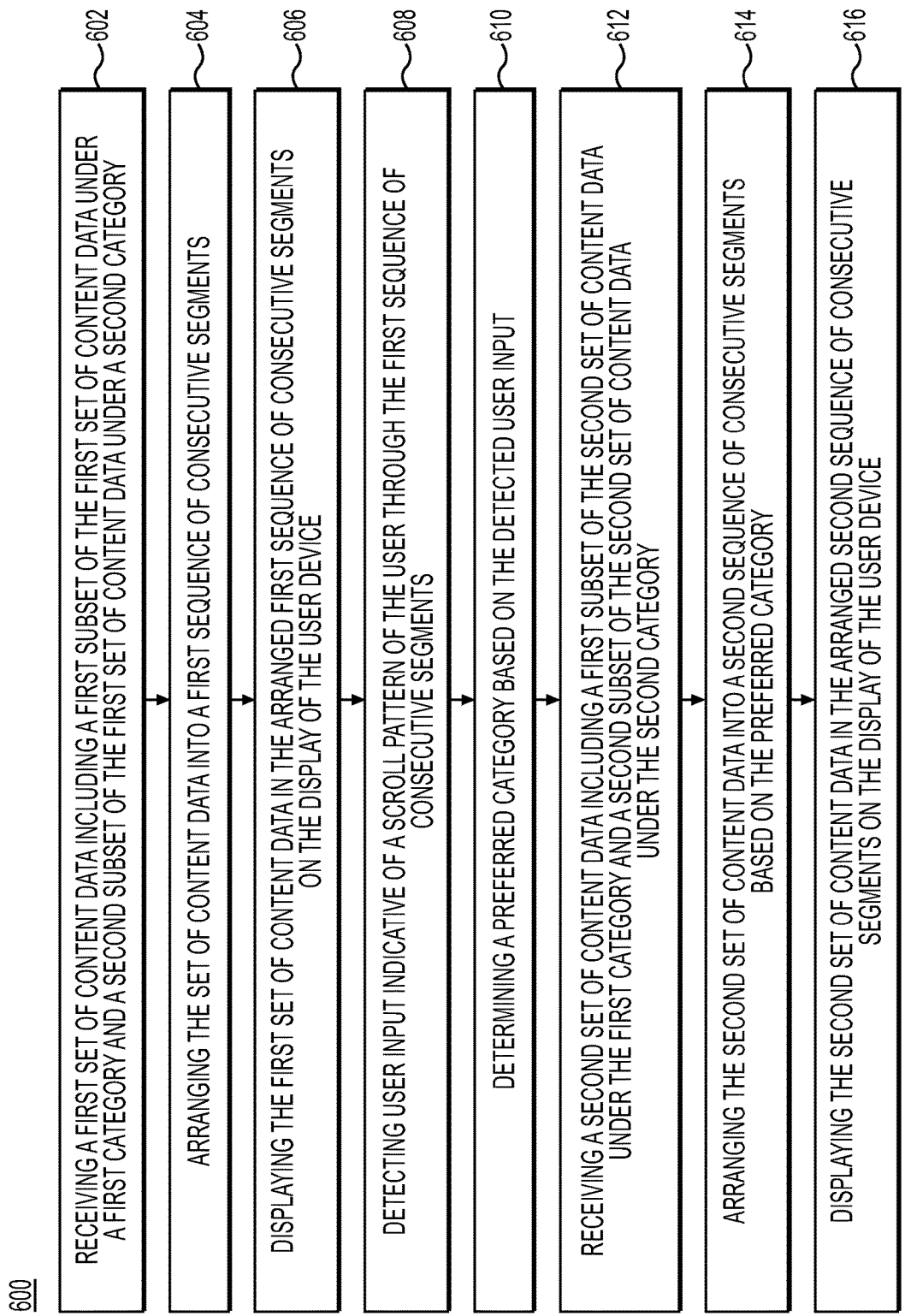
FIG. 6 depicts a flowchart of an exemplary method of displaying content on a user device, according to one or more embodiments.

FIG. 6 depicts a flowchart of an exemplary process 600 of displaying content on a user device (e.g., user device 110) according to one or more embodiments, and may be performed in the exemplary environment of FIG. 1. Process 600 may, in some embodiments, begin with step 602, in which a first set of content data may be received. The first set of content data may include a first subset of the first set of content data under a first category and a second subset of the first set of content data under a second category. In step 604, the first set of content data may be arranged into a first sequence of consecutive segments. In some embodiments, the first sequence of consecutive segments comprises a first segment including the first subset of the first set of content data and a second segment including the second subset of the first set of content data. In step 606, the first set of content data may be displayed in the arranged first sequence of consecutive segments on the display of the user device, wherein the user device is associated with a user. In step 608, user input indicative of a scroll pattern of the user through the first sequence of consecutive segments may be detected. In step 610, a preferred category may be determined based on the detected user input. In some embodiments, the preferred category is the first category or the second category.

In step 612, a second set of content data may be received. The second set of content data may include a first subset of the second set of content data under the first category and a second subset of the second set of content data under the second category. In step 614, the second set of content data may be arranged into a second sequence of consecutive segments based on the preferred category. In some embodiments, the second sequence of consecutive segments comprises a first segment including the first subset of the second set of content data and a second segment including the second subset of the second set of content data. In step 616, the second set of content data may be displayed in the arranged second sequence of consecutive segments on the display of the user device.

In some embodiments, process 600 may include a further step in which the first subset of the second set of content data or the second subset of the second set of content data may be identified as the segment associated with the preferred category. In some embodiments, process 600 may further include storing the second sequence of consecutive segments as a default sequence of consecutive segments for another user.

In some embodiments, the identified segment may be the first subset of the second set of content data, and arranging the second set of content data into the second sequence of consecutive segments based on the preferred category may include arranging the second set of content data into the second sequence of consecutive segments such that the first subset of the second set of content data is followed by the second subset of the second set of content data.

In some embodiments, the identified segment may be the first subset of the second set of content data, and displaying the second set of content data in the arranged second sequence of consecutive segments on the display of the user device may include displaying the first subset of the second set of content data to the user of the user device before the second subset of the second set of content data.

In some embodiments, the identified segment may be the first subset of the second set of content data, and displaying the second set of content data in the arranged second sequence of consecutive segments on the display of the user device may include automatically scrolling through the displayed second sequence of consecutive segments to the first subset of the second set of content data.

In some embodiments, detecting user input indicative of the scroll pattern of the user through the first sequence of consecutive segments may include: detecting a pause in the scroll pattern of the user; determining whether the pause exceeds a predetermined period of time; and determining a segment displayed to the user during the pause based on a determination that the pause exceeds the predetermined period of time, wherein the displayed segment comprises the first segment including the first subset of the first set of content data or the second segment including the second subset of the first set of content data.

In some embodiments, determining the preferred category based on the detected user input may include determining a category associated with the displayed segment, wherein the category comprises the first category or the second category.

In some embodiments, process 600 may further include determining whether the first category or the second category had been determined as a previously preferred category; and determining, based on a determination that the first category had been determined as a previously preferred category, whether the first category is the preferred category based on the detected user input indicative of the scroll pattern of the user through the first sequence of the consecutive segments.

In some embodiments, process 600 may further include: detecting user input indicative of a second scroll pattern of the user through the second sequence of consecutive segments; and determining a difference between the scroll pattern of the user and the second scroll pattern of the user.

Figure 7:
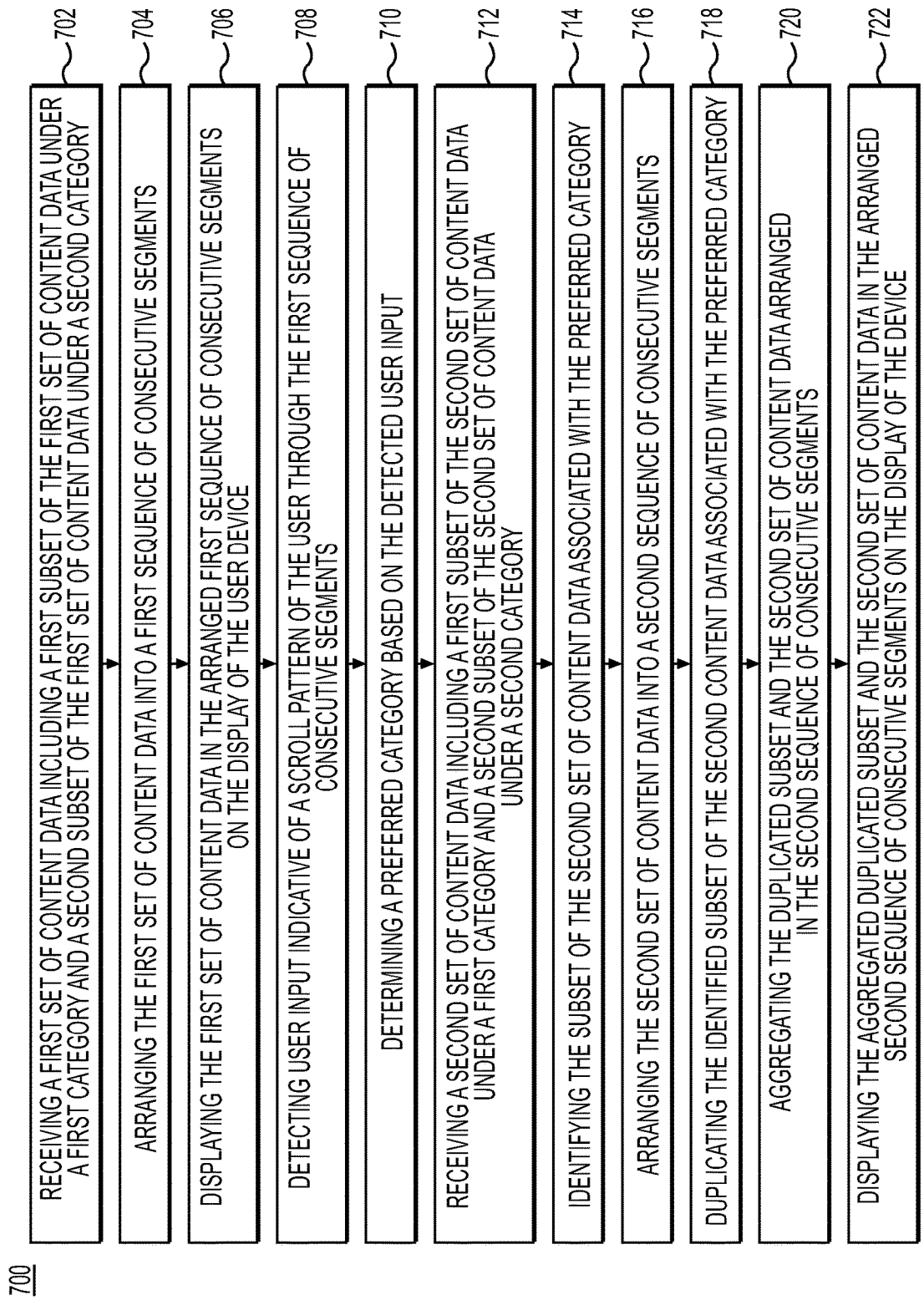
FIG. 7 depicts a flowchart of an exemplary method of displaying content on a user device, according to one or more embodiments.

FIG. 7 depicts a flowchart of an exemplary process 700 of displaying content on a user device (e.g., user device 110) according to one or more embodiments, and may be performed in the exemplary environment of FIG. 1. Process 700 may, in some embodiments, begin with step 702, in which a first set of content data may be received. In some embodiments, the first set of content data may include a first subset of the first set of content data under a first category and a second subset of the first set of content data under a second category. In step 704, the first set of content data may be arranged into a first sequence of consecutive segments. In some embodiments, the first sequence of consecutive segments comprises a first segment including the first subset of the first set of content data and a second segment including the second subset of the first set of content data. In step 706, the first set of content data may be displayed in the arranged first sequence of consecutive segments on the display of the user device. In step 708, user input indicative of a scroll pattern of the user may be detected through the first sequence of consecutive segments. In step 710, a preferred category may be determined based on the detected user input. In some embodiments, the preferred category is the first category or the second category.

In step 712, a second set of content data may be received. In some embodiments, the second set of content data may include a first subset of the second set of content data under the first category and a second subset of the second set of content data under the second category. In step 714, the subset of the second set of content data associated with the preferred category may be identified. In step 716, the second set of content data may be arranged into a second sequence of consecutive segments. In some embodiments, the second sequence of consecutive segments comprises a first segment including the first subset of the second set of content data and a second segment including the second subset of the second set of content data.

In step 718, the identified subset of the second content data associated with the preferred category may be duplicated. In step 720, the duplicated subset associated with the preferred category and the second set of content data arranged in the second sequence of consecutive segments may be aggregated. In step 722, the aggregated duplicated subset and the second set of content data in the arranged second sequence of consecutive segments may be displayed on the display of the device.

In general, any process discussed in this disclosure that is understood to be computer-implementable, such as the processes illustrated in FIGS. 6-7 may be performed by one or more processors of a computer system, such as user device 110, one or more computers associated with service systems 140, and/or one or more computers associated with content providers 120, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as user device 110, a computer system of server system 140, or a computer system of content provider 120, may include one or more computing devices. If the one or more processors are implemented as a plurality of processors, the plurality of processors may be included in a single computing device or distributed among a plurality of computing devices. If a computer system comprises a plurality of computing devices, the memory of the computer system may include the respective memory of each computing device of the plurality of computing devices.

Figure 8:
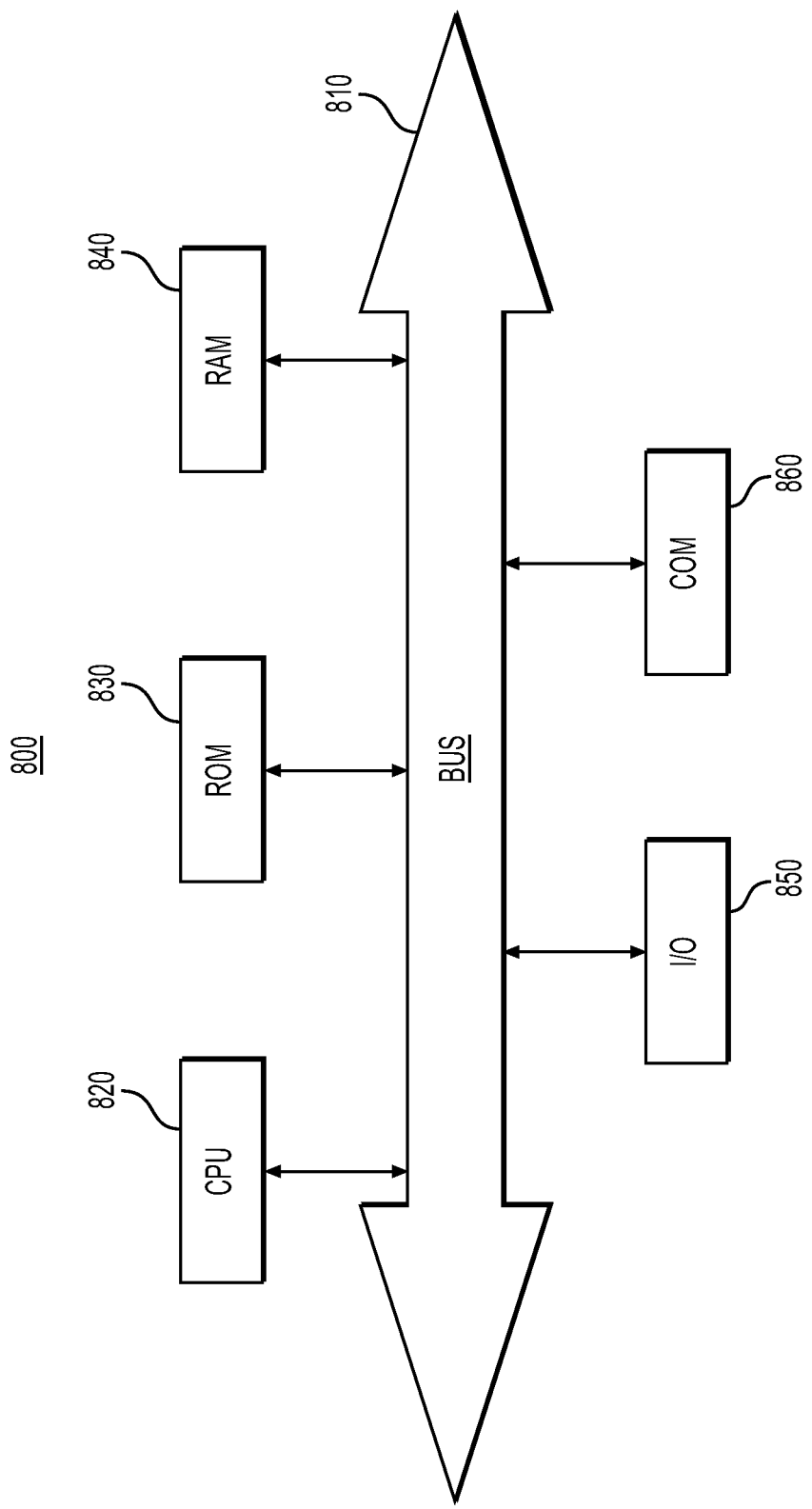
FIG. 8 depicts an example of a computing device, according to one or more embodiments.

FIG. 8 illustrates an example of a computing device 800 of a computer system, such as user device 110, a computer system of server system 140, or a computer system of content provider 120. As shown in FIG. 8, device 800 (e.g., user device 110, content providers 120, and/or server systems 140) may include a central processing unit (CPU) 820. CPU 820 may be any type of processor device including, for example, any type of special purpose or a general-purpose microprocessor device. As will be appreciated by persons skilled in the relevant art, CPU 820 also may be a single processor in a multi-core/multiprocessor system, such system operating alone, or in a cluster of computing devices operating in a cluster or server farm. CPU 820 may be connected to a data communication infrastructure 810, for example, a bus, message queue, network, or multi-core message-passing scheme.

Device 800 may include a main memory 840, for example, random access memory (RAM), and also may include a secondary memory 830. Secondary memory 830, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 830 may include other similar means for allowing computer programs or other instructions to be loaded into device 800. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 800.

Device 800 also may include a communications interface ("COM") 860. Communications interface 860 allows software and data to be transferred between device 800 and external devices. Communications interface 860 may include a modem, a network interface (such as an Ethernet card), a communications port, a PCMCIA slot and card, or the like. Software and data transferred via communications interface 860 may be in the form of signals, which may be electronic, electromagnetic, optical, or other signals capable of being received by communications interface 860. These signals may be provided to communications interface 860 via a communications path of device 800, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 800 also may include input and output ports 850 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order (e.g., steps may be added, removed, or repeated), or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A method for displaying content on a user device including a display, comprising:
    receiving, via one or more processors, a first set of data including a first subset of the first set of data under a first category and a second subset of the first set of data under a second category;
    arranging, via the one or more processors, the first set of data into a first sequence of consecutive segments, wherein the first sequence of consecutive segments comprises a first segment including the first subset of the first set of data and a second segment including the second subset of the first set of data;
    causing, via the one or more processors, presentation of the first set of data in the arranged first sequence of consecutive segments on the display of the user device;
    detecting, via the one or more processors, user input indicative of a scroll pattern through the first sequence of consecutive segments;
    determining, via the one or more processors, a first predicted pause duration for the first segment and a second predicted pause duration for the second segment;
    comparing, via the one or more processors, the detected user input to the first predicted pause duration for the first segment and the second predicted pause duration for the second segment to determine a preferred category, the preferred category being the first category or the second category; and
    receiving and arranging, via the one or more processors, a second set of data based on the preferred category.

2. The method of claim 1, wherein the second set of data includes a first subset of the second set of data and a second subset of the second set of data, the method further comprising:
    associating, via the one or more processors, the first subset of the second set of data with the preferred category.

3. The method of claim 2, wherein the second set of data is arranged such that the first subset of the second set of data is followed by the second subset of the second set of data.

4. The method of claim 2, further comprising:
    causing, via the one or more processors, presentation of the first subset of the second set of data on the user device such that it is positioned above the second subset of the second set of data on the user device.

5. The method of claim 2, further comprising:
    causing, via the one or more processors, presentation of the second subset of the second set of data on the user device such that it is positioned above the first subset of the second set of data on the user device; and
    automatically scrolling through the second subset of the second set of data to the first subset of the second set of data.

6. The method of claim 1, wherein detecting user input indicative of the scroll pattern comprises:
    detecting a speed of the scroll pattern;
    determining whether the speed is below a speed threshold for a predetermined period of time; and
    in response to a determination that the speed is below the speed threshold for the predetermined period of time, identifying a segment displayed to the user when the speed is below the speed threshold for the predetermined period of time.

7. The method of claim 6, wherein the identified segment is associated with the first category;
    wherein determining the preferred category comprises determining that the identified segment is associated with the first category.

8. The method of claim 1, further comprising:
in response to receiving the first set of data, determining a previously preferred category;
wherein the first set of data is arranged based on the previously preferred category.

9. The method of claim 1, further comprising:
rearranging the first set of data based on the preferred category.

10. The method of claim 9, wherein the first category is the preferred category and rearranging the first set of data comprises:
positioning the first segment above the second segment.

11. A device for displaying content, comprising:
a memory;
a display; and
one or more processors, the one or more processors configured to:
receive a first set of data including a first subset of the first set of data under a first category and a second subset of the first set of data under a second category;
arrange the first set of data into a first sequence of consecutive segments, wherein the first sequence of consecutive segments comprises a first segment including the first subset of the first set of data and a second segment including the second subset of the first set of data;
display the first set of data in the arranged first sequence of consecutive segments on the display of the device, wherein the device is associated with a user;
detect user input indicative of a scroll pattern of the user through the first sequence of consecutive segments;
determine a first predicted pause duration for the first segment and a second predicted pause duration for the second segment;
compare the detected user input to the first predicted pause duration for the first segment and the second predicted pause duration for the second segment to determine a preferred category, wherein the preferred category is the first or the second category; and
receive and arrange a second set of data based on the preferred category.

12. The device of claim 11, wherein the second set of data includes a first subset of the second set of data and a second subset of the second set of data, and wherein the one or more processors are further configured to:
associate the first subset of the second set of data with the preferred category.

13. The device of claim 12, wherein the second set of data is arranged such that the first subset of the second set of data is followed by the second subset of the second set of data.

14. The device of claim 12, wherein the one or more processors are further configured to:
cause presentation of the first subset of the second set of data on the user device such that it is positioned above the second subset of the second set of data on the user device.

15. The device of claim 12, wherein the one or more processors are further configured to:
cause presentation of the second subset of the second set of data on the user device such that it is positioned above the first subset of the second set of data on the user device; and
automatically scroll through the second subset of the second set of data to the first subset of the second set of data.

16. The device of claim 11, wherein detecting user input indicative of the scroll pattern of the user through the first sequence of consecutive segments comprises:
detecting a speed of the scroll pattern;
determining whether the speed is below a speed threshold for a predetermined period of time; and
in response to a determination that the speed is below the speed threshold for the predetermined period of time, identifying a segment displayed to the user when the speed is below the speed threshold for the predetermined period of time.

17. The device of claim 16, wherein the identified segment is associated with the first category;
wherein determining the preferred category comprises determining that the identified segment is associated with the first category.

18. A method for displaying content on a user device including a display, comprising:
receiving, via one or more processors, a first set of data including a first subset of the first set of data under a first category and a second subset of the first set of data under a second category;
arranging, via the one or more processors, the first set of data into a first sequence of segments, wherein the first sequence of segments comprises a first segment including the first subset of the first set of data and a second segment including the second subset of the first set of data;
causing, via the one or more processors, presentation of the first set of data in the arranged first sequence of segments on the display of the user device;
detecting, via the one or more processors, user input indicative of a scroll pattern of the user through the first sequence of segments;
determining, via the one or more processors, a first predicted pause duration for the first segment and a second predicted pause duration for the second segment;
comparing, via the one or more processors, the detected user input to the first predicted pause duration for the first segment and the second predicted pause duration for the second segment to determine a preferred category, wherein the preferred category is the first category or the second category; and
rearranging, via the one or more processors, the first set of data into a second sequence of segments based on the preferred category, the second sequence of segments differing from the first sequence of segments.

19. The method of claim 18, wherein rearranging the first set of data comprises:
repositioning the second segment from a first position below the first segment to a second position above the first segment.

20. The method of claim 18, wherein rearranging the first set of data comprises:
duplicating the second segment to create a duplicate second segment; and positioning the second segment in a first position below the first segment and the duplicate second segment in a second position above the first segment.

* * * * *